United States Patent [19]

Smith

[11] Patent Number: 4,705,423
[45] Date of Patent: Nov. 10, 1987

[54] INTEGRAL FRAME CONNECTING APPARATUS

[76] Inventor: Kevin Smith, 796 Fifth Ave., Troy, N.Y. 12182

[21] Appl. No.: 874,390

[22] Filed: Jun. 16, 1986

[51] Int. Cl.$^4$ ............................................... F16B 7/00
[52] U.S. Cl. .................................... 403/254; 403/353; 403/240; 403/350
[58] Field of Search .............. 403/254, 255, 187, 188, 403/230, 240, 252, 321, 322, 348, 349, 350, 330, 49, 353; 285/81, 362

[56] References Cited

U.S. PATENT DOCUMENTS

| | | | |
|---|---|---|---|
| 922,919 | 5/1909 | Lawrence | 403/230 X |
| 1,524,406 | 1/1925 | Pinklo | 403/230 X |
| 2,850,306 | 9/1958 | Gordon | 403/230 X |
| 3,009,716 | 11/1961 | Otto et al. | 403/252 |
| 3,632,142 | 1/1972 | Ichihara | 285/362 X |
| 3,858,990 | 1/1975 | Busselmeier | 403/252 X |
| 3,963,361 | 6/1976 | Schenk | 403/349 X |
| 3,982,841 | 9/1976 | Endzweig . | |
| 3,989,399 | 11/1976 | Slowbe | 403/230 X |
| 4,063,836 | 12/1977 | Militano | 403/322 X |
| 4,065,890 | 1/1978 | Fenner | 403/349 X |
| 4,140,414 | 2/1979 | Buttgereit . | |
| 4,545,697 | 10/1985 | Verdenne et al. | 403/230 |

FOREIGN PATENT DOCUMENTS

| | | | |
|---|---|---|---|
| 1948240 | 4/1971 | Fed. Rep. of Germany | 403/187 |
| 2527404 | 1/1976 | Fed. Rep. of Germany | 403/349 |
| 1477591 | 3/1967 | France | 403/187 |

Primary Examiner—Richard J. Scanlan, Jr.
Assistant Examiner—Joseph A. Fischetti
Attorney, Agent, or Firm—Schmeiser, Morelle & Watts

[57] ABSTRACT

A mechanism for removably joining elongate frame members comprised essentially of a series of geometrical apertures in some frame members which are adapted to receive specially designed, geometry-conforming detents or keys which have been affixed to, or constructed integrally with, adjoinable frame members. Major connecting action is effected by insertion of one member, a strut which has special cylindrical projections at its ends, into another member, a spar which has a special keyway for receiving said projections, and rotating said strut into a position which, because of the unique geometry of said projections and internal surfaces of said spar, result in capture of the projections, thus immobilizing said strut.

Two adjunct locking mechanisms are suggested for rigidifying connections of the preferred embodiment. The first such locking mechanism employs detent means, the second, lever and snubbing action.

3 Claims, 8 Drawing Figures

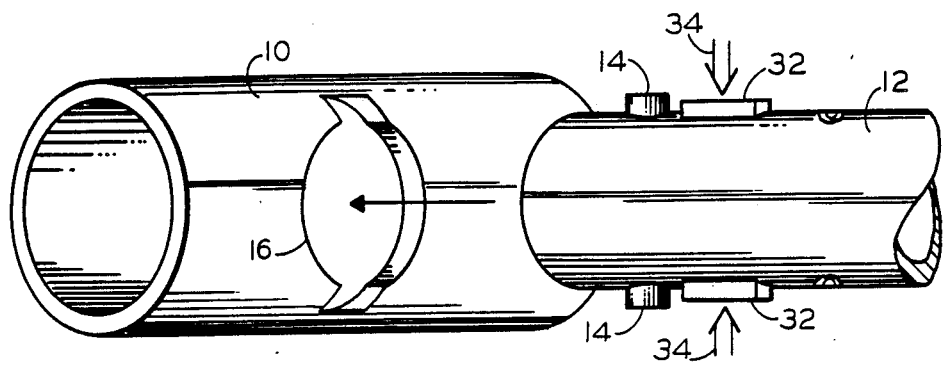
Fig_2A_
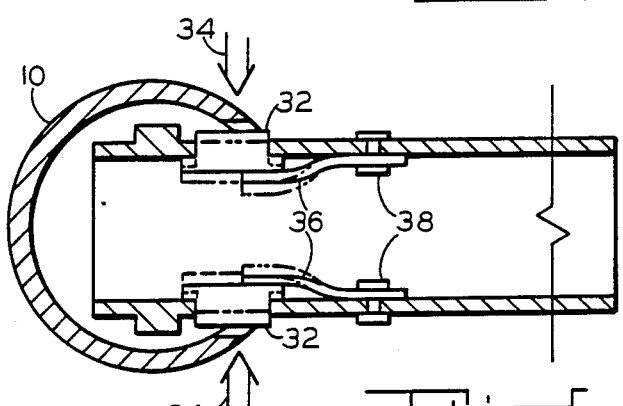
Fig_2B_
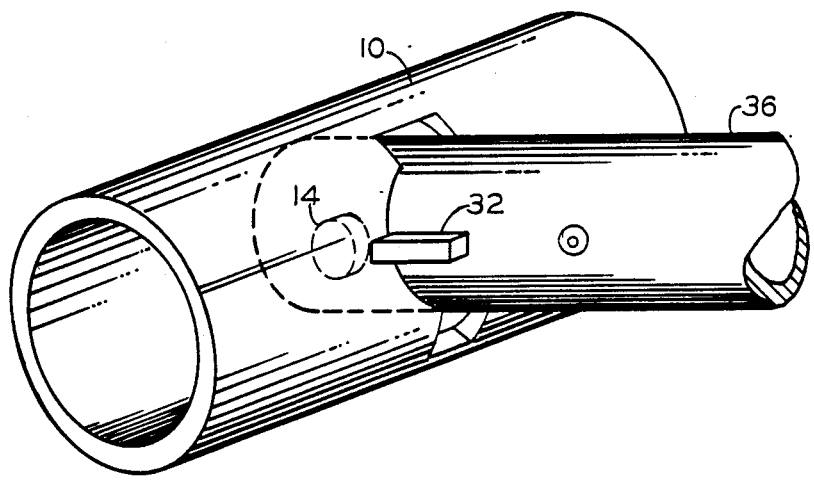
Fig_2c_

INTEGRAL FRAME CONNECTING APPARATUS

FIELD OF THE INVENTION

This invention relates generally to devices and apparatus which are used for connecting the various members of frames, scaffolding, and structural networks. Specifically, it relates to the joining of individual struts or members, one to the other, within the aforementioned frames or networks.

BACKGROUND AND OBJECTS OF THE INVENTION

Framing, the practice of constructing a skeletal shape of a functional unit out of elongated, strong and relatively unyielding base materials, is enjoying widespread use in today's industrialized, mechanized and technocratic society. The advent of new and durable materials from which framework members can be constructed has further enhanced the use of non-integral, i.e., frame not formed as part of the plane surfaces, and non-unitary framework. Where earlier metallic frame members had to be bolted or welded to each other to achieve a desired network, it is now possible, using materials such as polyvinylchloride (PVC) plastics, to cast such frames in a single piece. Such an alternative, however, is not always the desirable one. Oftentimes, a particular application might best be realized by retaining the traditional member-fixed-to-member means for building the framework. By constructing the individual members of the new materials, not only can their usefulness be exploited, but the versatility of the more traditional and basic frame making technique is retained.

In my practice of constructing various frameworks, especially using frame members composed of PVC materials, I have often found myself impeded by the lack of an easily assembled, strong and reliable means of connecting the frame members. The materials with which I have chosen to work, particularly PVC tubular frame members, do not lend themselves to easy interconnectivity save for actual cementing, a process requiring special cleaning and preparation in conjunction with use of a certain costly solvent-cement. The more traditional joining means such as bolting or cementing, analogous to metal welding, are cumbersome, time-consuming and limited in application. Further, and most importantly, they require the use of extra parts, additional equipment, and all to often, two or more persons to build a desired structure. Frame members which contain joining apparatus, although functional and of great utility are, as noted above, limited in their application in that they must be connected to, and in turn connected by, discrete parts at discrete locations.

A considerable advance in the method of connecting frame members was suggested by Endzweig in his patent for CONNECTING APPARATUS FOR FRAME MEMBERS, U.S. Pat. No. 3,982,841, which issued on Sept. 28, 1976. Endzweig suggested a novel means of interlinking various frame members by attaching them at their respective ends to a common ball-shaped receptacle which received a projection from a frame member which was movably secured within the end of that frame member. Apertures within the receptacle received the projections, which were geometric fits to the apertures, from the ends of the frame members. Once the projection of a frame member is inserted into the receptacle, it is rotated to a locked position and a spring-loaded collar, extending from the frame member, snuggly secures the projection within the receptacle. Thereafter, and at differing locations on the receptacle surface, other frame members are attached in similar fashion. Thus, what results from the Endzweig teaching is a structural framework comprised of members each of which has at least one end adapted to fit into a receptacle, as described above, all co-joined through a plurality of such receptacles.

I feel that Endzweig contributed significantly to the field; however, I cannot help but conclude that the use of an additional member, the ball-like receptacle containing a plurality of apertures, is an unnecessary limitation and, with the use of an intricate protruding mechanism and spring-loaded collar, undesirably complex.

Other framework connectors have been suggested, such as that described by Buttgereit's WEDGE CLAMP SCAFFOLD JOINT, U.S. Pat. No. 4,140,414, which issued on Feb. 20, 1979. Buttgereit also employs the principle of connecting one frame member, having an end projection, into a receiving frame member, having therein a key way adapted to receive the projection and means for snubbing the members in a fixed spaced-apart relationship (once the projection is secure within the keyway). Such a means has been employed for years for affixing the rails of a bedframe to the head- and footboards. The method is a good one in that no additional parts are necessary; however, such jointing means are devised to withstand uni-directional forces only and cannot withstand transverse shock or omni-directional forces.

It is with the advantages, as well as the shortcomings of excellent prior art, that I decided to develop a means for interlocking the elongated structural members of frameworks. The frameworks that could use such a joining technique are myriad and run the range of structural frame-works for automobile carrying racks to scaffolds, to bedframes.

It is therefore an object of this invention to develop a means for joining the separate elements or members of a framework while employing a minimum of parts.

It is another object of this invention to provide an interconnected arrangement capable of functioning in a motive or vibrational environment.

A concomitant object of my invention is to develop a connecting arrangement which is simple, easily handled, inexpensive and, in addition to possessing an inherent versatility, safe and reliable.

It is further an object of this invention to develop a frame member joining means which will be integral with the frame members.

Yet another object of this invention is to produce a frame joining apparatus which is not limited to a single connection at any one end of a frame member.

It is still another object of this invention to develop a framework connection which, for the most part, can function without the addition of other snubbing or securing apparatus.

Objects and advantages of the invention are set forth in part herein or may be obvious, or learned by attendance to this disclosure, or practice with the invention.

SUMMARY OF THE INVENTION

The objects of this invention may be realized by forming a series of structural joinings made by connection of two frame members in the hereinafter described fashion, a mechanism which the inventor calls FRAMLOK and QUICKLOK. A frame member-an elongated, hollow, cylindrical or tubular structure-is composed preferably of PVC, but could be made of tubular steel or other strong, unyielding material which could be cast, drawn or fashioned into the desirable shape.

For the sake of simplicity, I will partition my structural members into two generic elements, referred to hereinafter as spar (female) and strut (male) members. A spar member is a tubular member having located at various points in its cylindrical surface specially sized and configured keyways, capable of receiving through the major opening of any keyway, a correspondingly-sized strut end. In similar fashion, a strut is generally of a slightly smaller diameter than a spar into which it may be fitted. The strut has detents protruding from each end which geometrically conform to the minor apertures of a keyway (in a particular spar that is meant to receive the particular strut).

The projections or detents at each end of a strut are essentially cylindrical and will pass through the corresponding keyway, in a spar, with very little clearance. Once the end of a strut is inserted into a keyway of a spar, the strut is rotated and the detents are aligned longitudinally with respect to the spar.

The keyway of the spar is generally oriented so as to receive the detents of the strut at some angle well off the spar's longitudinal center line, say approximately 35 to 50 degrees. Such inclination of the keyway will allow the detented strut end (or key) to be inserted and then rotated so as to align with the longitudinal axis of the spar. Then, upon a slight withdrawal motion of the strut, the detents being cylindrical in shape, will readily abut the inner cylindrical surface of the spar and, if an extracting force is continuously applied to the strut, become immobile with respect thereto.

The keyway chosen, as essentially circular hole with two opposing rectangular cutouts, provides the simplest geometric form adaptive to the uncomplicated strut end-detent type of key.

Great versatility may be inculcated in the production of this invention by merely placing various positioned keyways at differing locations on a spar. Of course, it must be understood that such keyways must be conscientiously placed or else indiscriminate placement of multiple keyways, in any spar, will structurally weaken it.

The foregoing general description and the following detailed description as well are exemplary of the invention but are not intended to limit it in any way. Thus, in my description of the preferred embodiment, I will reveal additional snubbing, securing or locking means which, though not in themselves without considerable utility, would be best utilized in conjunction with my structural connection means or joiner.

The accompanying drawings, referred to herein and constituting a part hereof, illustrate a single preferred embodiment of the invention, and together with the description, will serve to explain the principles thereof.

BRIEF DESCRIPTION OF THE DRAWINGS

Of the drawings:

FIG. 2A is a perspective view of a snubbing or locking apparatus prior to full engagement;

FIG. 2B is a partial cross-sectional view of a locking mechanism;

FIG. 2C is a perspective view of the strut inserted and locked into a spur;

DETAILED DESCRIPTION OF THE PREFERRED EMBODIMENT

Figure 1A:
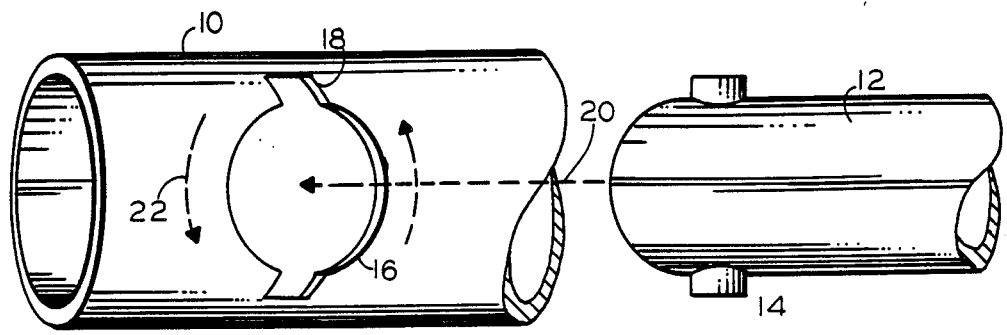
FIG. 1A is a perspective view of the preparatory step for inserting a strut into the keyway of a spar.

Referring more particularly to FIG. 1A of the accompanying drawings, there is illustrated a typical PVC spar member 10 poised to receive strut 12 which bears the 180° opposed projections or detents 14. The spar (10) has been configured with a single keyway 16, in order to clearly illustrate the typical positioning of such. It should be noted that the keyway configuration is adapted to receive strut 12 with its projections 14 by constructing the keyway with additional keyway slots 18.

Since it is the intention to align the common centerline of detents 14 with the longitudinal centerline of spar 10, the rear should note that keyway slots 18 may be located in practically any position on the spar surface save positions which fall within approximately 20 of co-alignment of the aforementioned centerlines.

Figure 1B:
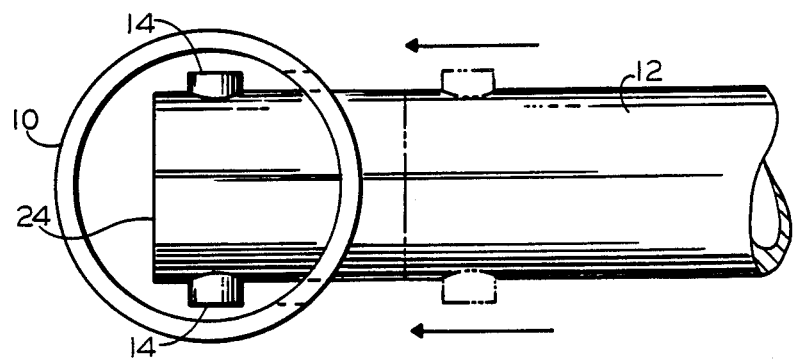
FIG. 1B is a sectional elevation showing the strut inserted into the spar.
Figure 1C:
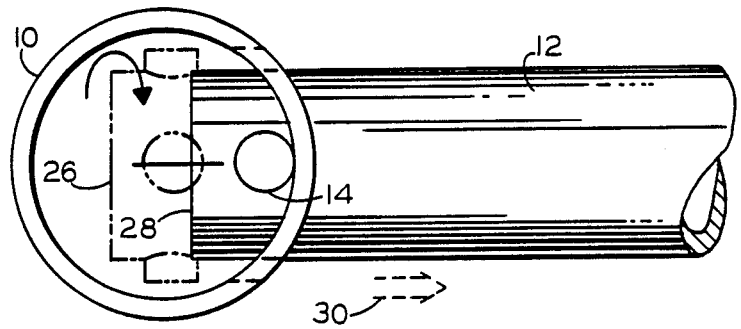
FIG. 1C is a sectional elevation showing the strut in a rotated and retracted position within the spar.

Continuing in the FIG. 1A arrangement, as well as that of FIG. 1B, once strut 12 is inserted in keyway 16, as indicated by dashed path 20, it is rotated in a fashion similar to that depicted by dashed curved line 22. This sequence of steps is indicated as step 24 in FIG. 1B, and step-positions 26 (phantom) and 28 of FIG. 1C.

Figure 3A:
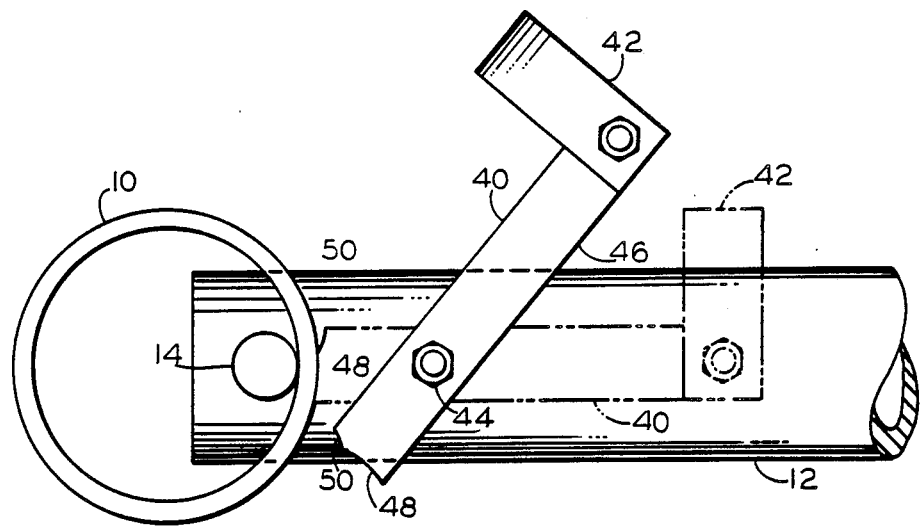
FIG. 3A is an end view elevation of a spar with a strut's locking mechanism displayed in lock and unlock positions.

Thus it may readily be seen, that in this simplest and preferred embodiment, a joining of two members of the prospective framework has been accomplished by means which are integral to the frame members. Thus, a major objective of the invention, in fact, all objectives of the invention, have been realized. To assure that the directional force depicted in FIG. 1C by phantom arrow 30, is maintained, I have suggested a locking mechanism which is illustrated in FIGS. 2 and 3.

Referring now to FIG. 2A, there is illustrated a strut 12 bearing, in addition to the detent 14, spring-biased slot detent 32. The strut is poised for insertion into keyway 16 of spar 10. Finger pressure force must first be applied in the manner depicted by arrows 34 to effect the posturing, after insertion, shown in FIG. 2B. The locking detents must be depressed, by force 34, from the actual position indicated to the phantom positions therein illustrated. Leaf springs 36 with the riveting attachments 38 are merely one means of biasing and retaining detents 32.

After the detents are depressed, and strut 12 is inserted, the strut may be rotated to the position displayed in FIG. 2C, withdrawn slightly, and as the leading edge of detent 14 engages the inner surface of spar 10, locking detents 32 are released from force 34, and the biasing spring 36 returns them to the locked position therein displayed.

For major structural efforts, a more rugged locking mechanism is desired. There is illustrated in FIG. 3 an additional securing mechanism which may be used in situations requiring greater rigidity than that found in light frame work.

The securing mechanism comprises a pair of rigid legs 40 held in a spaced-apart relationship by a saddle section 42 which is meant to generally conform with the shape of the external surface of strut 12. This unit is bolted or affixed at pivot point 44 so that the legs 40 effectively straddle spar 12 and are held captive in a parallel, spaced-apart relationship. The position depicted in FIG. 3A, unlocked, is the position of the securing or locking mechanism prior to, and during insertion and rotation of spar 12, within spur 10. Once the spar is rotated and withdrawn to the indicated position of FIG. 3, the unit 40-42 is rotated in the direction depicted by arrow 46 and becomes seated in the position indicated by phantoms 40'-42'. The contact end of legs 40 are shaped to conform generally to the outer surface of the spar. For this purpose, the contact ends are shaped as depicted at contact surface 48. So as not to impede the actual locking action, a notch at 50 has been cut out of contact surface 48.

Figure 3B:
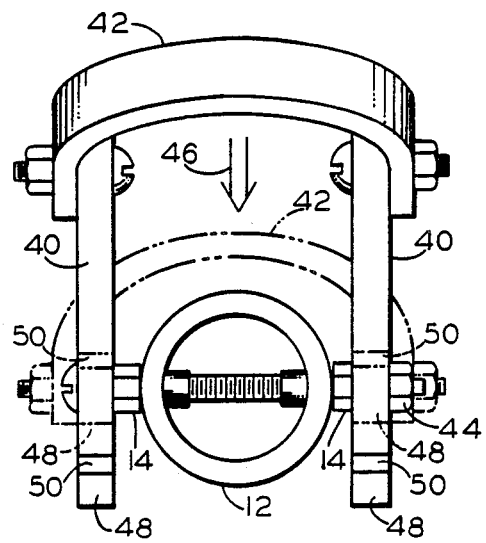
FIG. 3B is an end view of a strut adapted with the locking mechanism of FIG. 3A.

For the sake of clarity, FIG. 3B is used to illustrate the unlocked and locked positions of the securing or locking mechanisms relative to the end view of strut 12, to which it is attached. The embodiment herein depicted comprises nut and bolt connections (note that here projections 14 of the key mechanism comprise a pair of hexagonal-headed bolts, secured with hex nuts). This has been done because ease of assembly was desired by the inventor, and such contruction allowed him to illustrate the use of PVC tube and pipe sections to fabricate the securing or locking unit, in its entirety. Again, those versed in the art may employ several variations of these locking mechanism, but would perhaps do so at the sacrifice of simplicity and expedience. The locking mechanism, not required in most applications of this invention, may take on many embodiments, limited only by the ingenuity of the user.

The strut/spar connecting principle may also be employed with many variations, such as the placement of the keyways at varying locations on the surface of the spar members. However, the user must be careful not to weaken the structural integrity of the spars. Likewise, individual strut members may also contain keyways adapted for receiving smaller members which may be solid strutlettes or stringers.

The invention in its broader aspects is not limited to the specific embodiments herein shown and described, but departures may readily be made within the scope of the accompanying claims without departing from the basic principle of the invention, nor sacrificing its major objections and advantages.

What is claimed is:

1. A mechanism for removably joining elongate frame members comprising:
   a first elongate member having at least one essentially cylindrical key-end section bearing key means composed of two essentially cylindrical projections disposed 180 degrees to each other and situated on and close to the end of said key-end section, said key means being passable through a keyway defined in a second tubular elongate member having a concave inner surface, said second tubular elongate member having an essentially circular keyway therein, said keyway further comprising two slots disposed on the circular margin 180 degrees to each other and perpendicular to the longitudinal axis of said second elongate member and positioned so as to accept insertion of said projections when presented with the projections' longitudinal axis essentially perpendicular to the longitudinal axis of said second elongate member, whereby said removable joining is effected by inserting the key means of said first elongate member into the keyway of said second elongate member and rotating it after insertion so that the axis of said projections is aligned with the axis of said elongate member of said second elongate member and thereafter biasing said projections in the direction opposite insertion into the keyway, bringing said projections' outer surfaces into registry with said inner concave surface of said second tubular elongate member.

2. The invention of claim 1 further comprising snubbing means for biasing second tubular elongate member to said first elongate member.

3. The invention of claim 2 wherein said snubbing means further comprises at least one essentially non-circular lever means pivotally mounted to the exterior surface of said second member so as to allow one extensive surface of said lever means to be rotatably brought into registry with the outer surface of said first elongate member as said projections are biased, whereby a snubbing is effected, said key means is secured in registry with the inner concave surface of said first elongate member and reciprocative and rotational motion of said first elongate member are inhibited.

* * * * *